(12) United States Patent
McPhee

(10) Patent No.: US 10,471,786 B1
(45) Date of Patent: Nov. 12, 2019

(54) TRAILER HITCH SECUREMENT SYSTEM

(71) Applicant: John G. McPhee, Tampa, FL (US)

(72) Inventor: John G. McPhee, Tampa, FL (US)

( * ) Notice: Subject to any disclaimer, the term of this patent is extended or adjusted under 35 U.S.C. 154(b) by 0 days.

(21) Appl. No.: 15/630,217

(22) Filed: Jun. 22, 2017

(51) Int. Cl.
*B60D 1/36* (2006.01)
*B60D 1/155* (2006.01)

(52) U.S. Cl.
CPC .............. *B60D 1/36* (2013.01); *B60D 1/155* (2013.01)

(58) Field of Classification Search
CPC .......... B60D 1/36; B60D 1/155; B60D 1/167; B60D 1/28
See application file for complete search history.

(56) References Cited

U.S. PATENT DOCUMENTS

| | | | | |
|---|---|---|---|---|
| 2,788,990 A * | 4/1957 | Barcafer | ................. | B60D 1/28 280/457 |
| 2,834,611 A * | 5/1958 | Chenette | ................ | B60D 1/065 280/457 |
| 3,400,948 A * | 9/1968 | Matson | .................... | B60D 1/32 280/406.2 |
| 3,552,771 A * | 1/1971 | Hendricks | .............. | B60D 1/065 280/406.2 |
| 3,796,443 A * | 3/1974 | Crutchfield | .............. | B60D 1/06 280/406.2 |
| 4,774,823 A * | 10/1988 | Callison | ................... | B60D 1/60 280/507 |
| 5,378,008 A * | 1/1995 | McCrossen | ............ | B60D 1/065 280/507 |
| 5,476,281 A * | 12/1995 | Worthington | ............ | B60D 1/60 280/432 |
| 5,593,172 A * | 1/1997 | Breslin | ................... | B60D 1/155 280/491.5 |
| 5,868,414 A * | 2/1999 | McCoy | .................. | B60D 1/143 280/406.2 |
| 5,947,504 A * | 9/1999 | Milazzo | ................... | B60D 1/06 280/457 |
| 6,155,587 A * | 12/2000 | Milazzo | ................... | B60D 1/06 280/457 |
| 6,199,891 B1 * | 3/2001 | Bell | ....................... | B60D 1/065 280/432 |
| 6,382,657 B1 * | 5/2002 | Lynn | ...................... | B60D 1/065 280/457 |
| 8,186,702 B2 * | 5/2012 | McCoy | .................. | B60D 1/247 280/406.1 |
| 8,967,654 B1 * | 3/2015 | Riibe | ....................... | B60D 1/28 280/507 |
| 9,296,269 B1 * | 3/2016 | Riibe | ....................... | B60D 1/06 |
| 2009/0033061 A1 * | 2/2009 | Hensley | ................. | B60D 1/065 280/477 |
| 2010/0201100 A1 * | 8/2010 | Hill | .......................... | B60D 1/02 280/477 |
| 2015/0210132 A1 * | 7/2015 | Christensen | ........... | B60D 1/241 280/491.5 |

* cited by examiner

*Primary Examiner* — Tony H Winner
*Assistant Examiner* — Michael R Stabley

(57) ABSTRACT

A forward member extends rearwardly from a vehicle. A rearward member extends forwardly from a trailer. An intermediate member in a generally Z-shaped configuration has a leading section, a trailing section, and a central section. The trailing section is at an elevation above the leading section. The forward member is releasably coupled above the leading section of the intermediate member. The rearward member is releasably coupled to and above the trailing section of the intermediate member. A coupling assembly is between the trailing section and the rearward member.

2 Claims, 5 Drawing Sheets

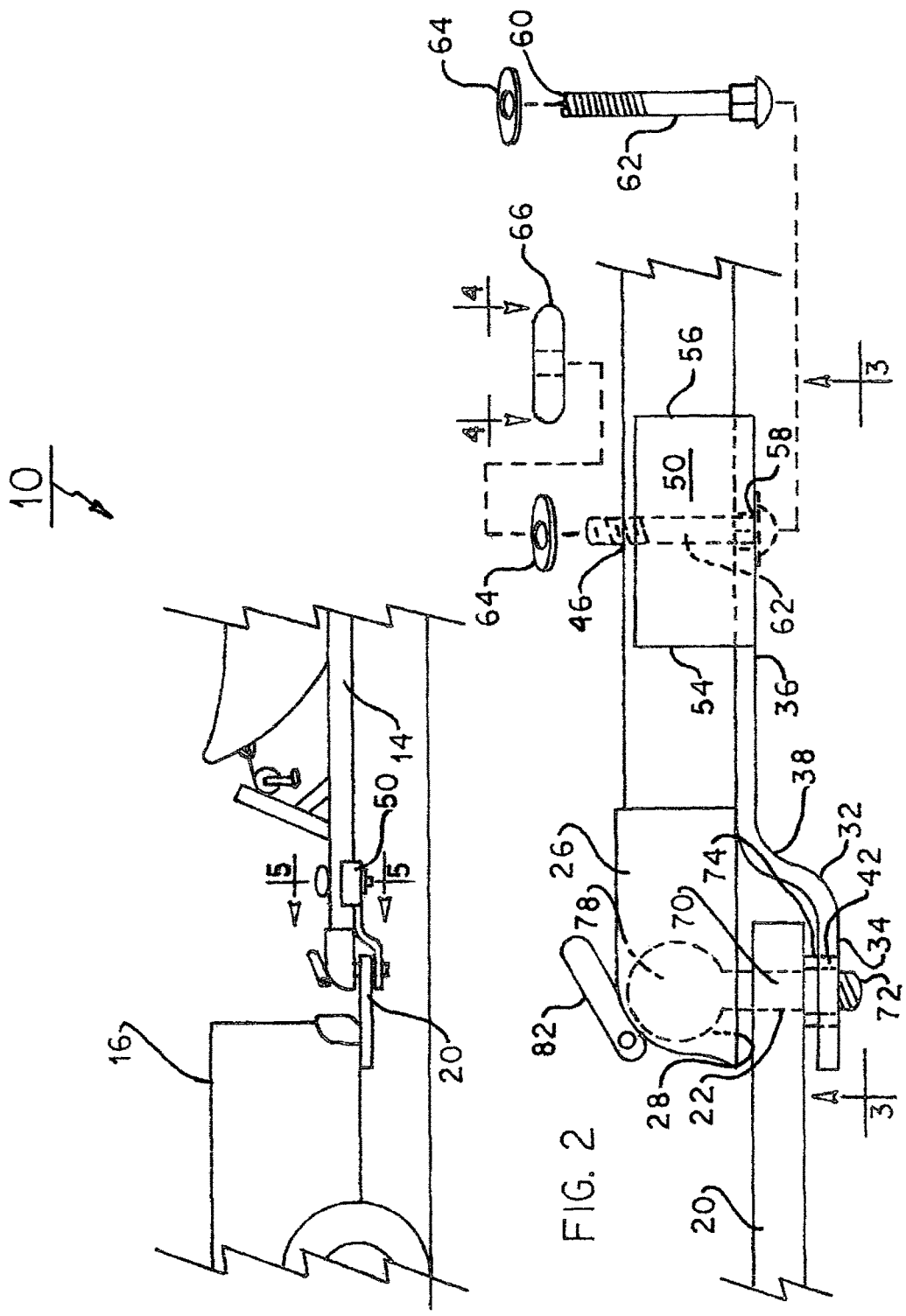

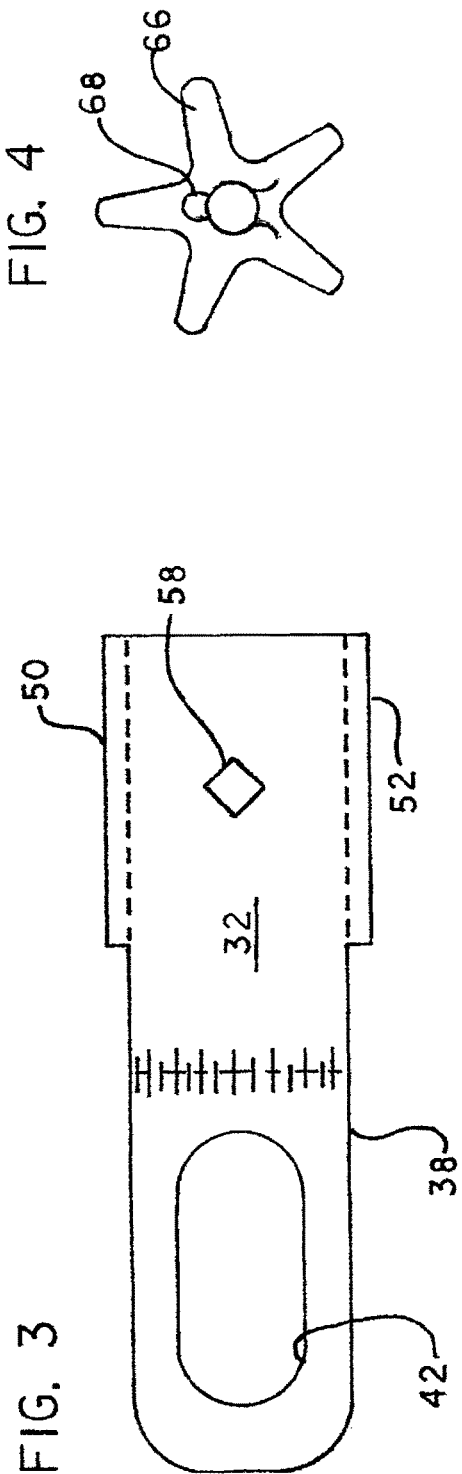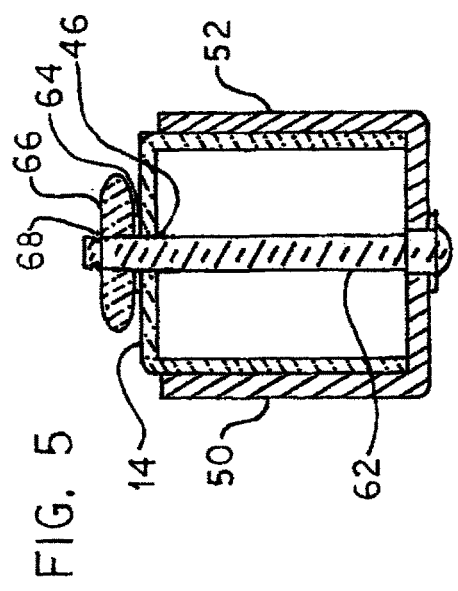

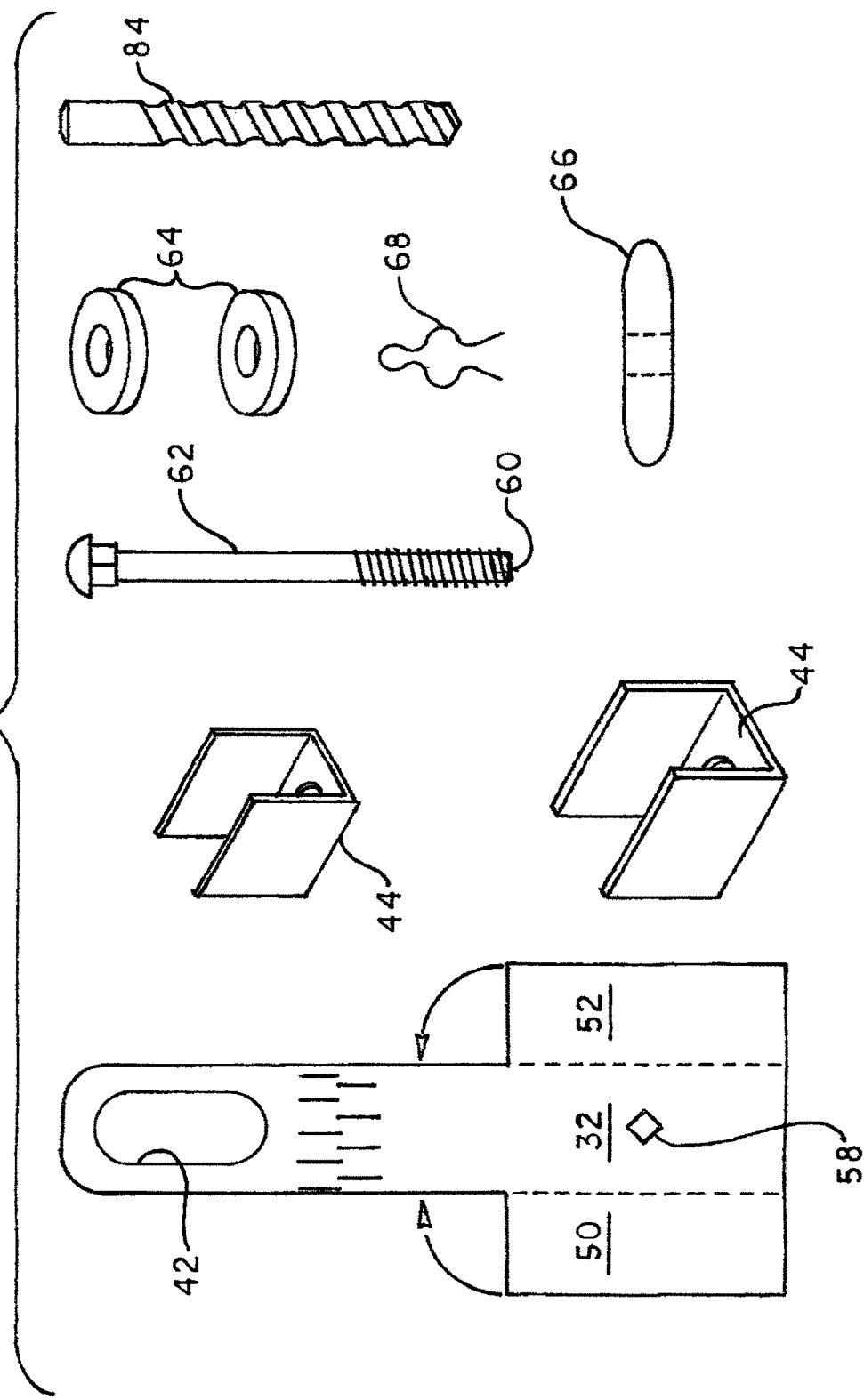

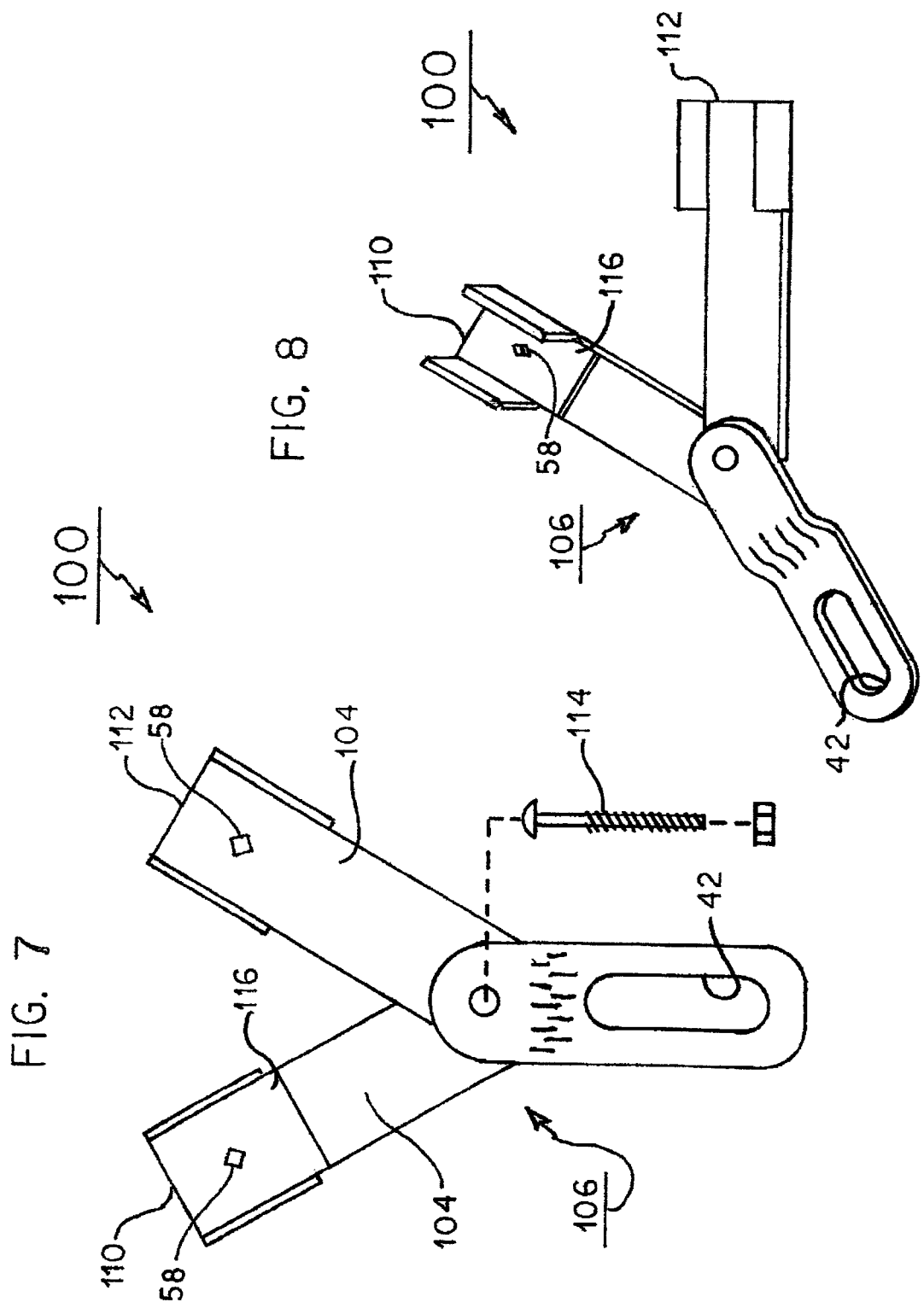

FIG. 9
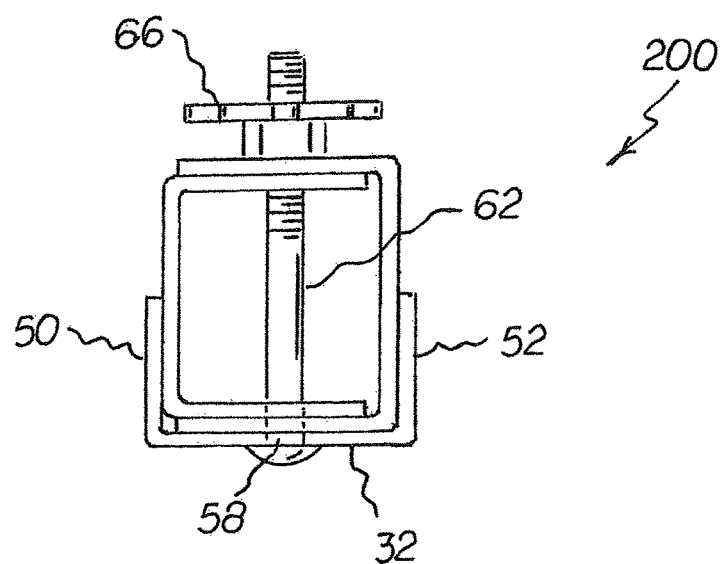
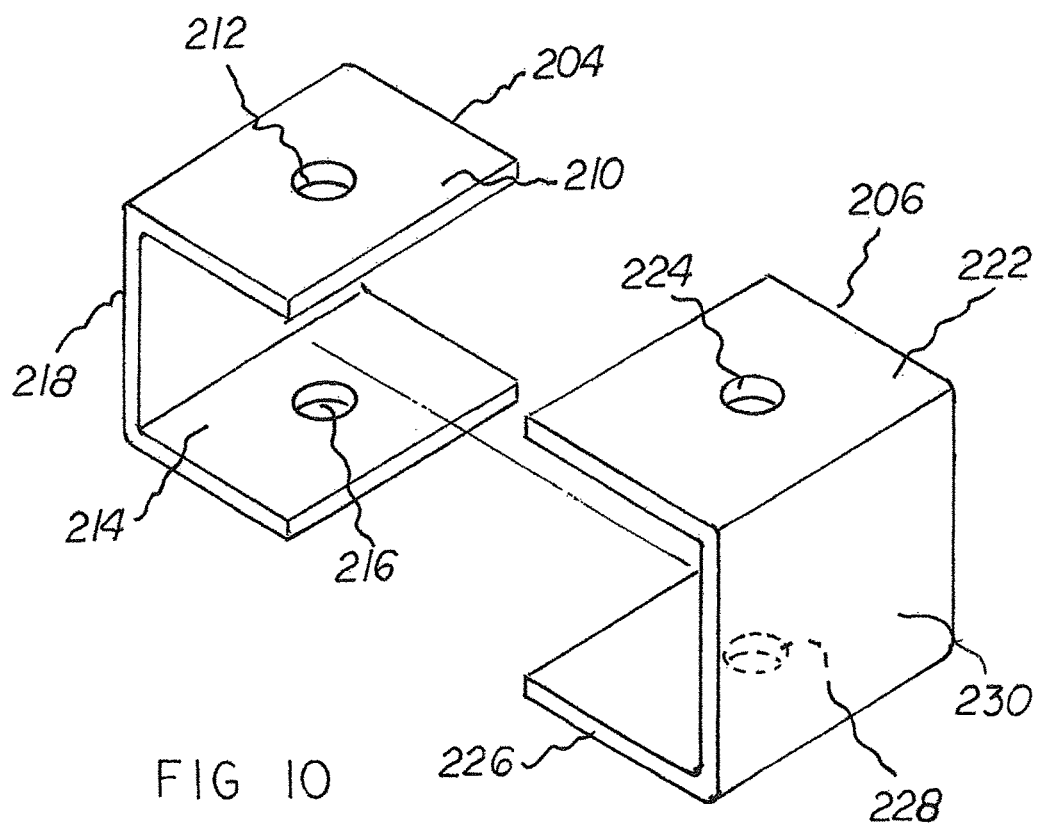
FIG 10

TRAILER HITCH SECUREMENT SYSTEM

RELATED APPLICATION

This application is a continuation-in-part of pending application Ser. No. 14/743,507 filed Jun. 18, 2015 which is based upon Provisional Application No. 62/014,462 filed Jun. 19, 2014, the subject matter of which applications is incorporated herein by reference.

BACKGROUND OF THE INVENTION

Field of the Invention

The present invention relates to a trailer hitch securement system and more particularly pertains to coupling a trailer to a towing vehicle and for maintaining a secure coupling of the trailer to the towing vehicle in the event of inadvertent vertical movement between the trailer and the towing vehicle, the coupling and the maintaining of the secure coupling being done in a safe, convenient, and economical manner.

DESCRIPTION OF THE PRIOR ART

The use of trailer hitch securement systems of known designs and configurations is known in the prior art. More specifically, trailer hitch securement systems of known designs and configurations previously devised and utilized for the purpose of coupling and securing trailers to towing vehicles are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a trailer hitch securement system that allows coupling a trailer to a towing vehicle and maintaining a secure coupling of the trailer to the towing vehicle in the event of inadvertent vertical movement between the trailer and the towing vehicle, the coupling and maintaining of the secure coupling being done in a safe, convenient, and economical manner.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Therefore, it can be appreciated that there exists a continuing need for a new and improved trailer hitch securement system which can be used for coupling a trailer to a towing vehicle and maintaining a secure coupling of the trailer to the towing vehicle in the event of inadvertent vertical movement between the trailer and the towing vehicle, the coupling and maintaining of the secure coupling being done in a safe, convenient, and economical manner. In this regard, the present invention substantially fulfills this need.

SUMMARY OF THE INVENTION

In view of the disadvantages inherent in the known types of securement systems of known designs and configurations now present in the prior art, the present invention provides an improved trailer hitch securement system. As such, the general purpose of the present invention, which will be described subsequently in greater detail, is to provide a new and improved trailer hitch securement system and method which has all the advantages of the prior art and none of the disadvantages.

To attain this, in the broad context of the invention, first provided is a forward member. The forward member has a first aperture. A rearward member is provided. The rearward member has a generally hemispherical configuration. The rearward member faces downwardly from above the first aperture. An intermediate member is also provided. The intermediate member is in a generally Z-shaped configuration. The intermediate member has a leading section, a trailing section, and a central section. The leading section has a second aperture. The trailing section is positioned beneath and in contact with a trailer. The trailing section has a third aperture. The trailing section has two tabs, vertically oriented tabs extending upwardly. The trailing section has a fourth aperture. The fourth aperture is provided between the two tabs. Provided next is a bolt. The bolt extends through the third aperture and the fourth aperture. Provided last is a vertical member. The vertical member has a lower end. The lower end extends through the first and second apertures. The vertical member has an upper end. The upper end has a ball. Such components are individually configured and correlated with respect to each other so as to attain the desired objective.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved trailer hitch securement system which has all of the advantages of the prior art trailer hitch securement systems of known designs and configurations and none of the disadvantages.

It is another object of the present invention to provide a new and improved trailer hitch securement system which may be easily and efficiently manufactured and marketed.

It is a further object of the present invention to provide a new and improved trailer hitch securement system which is of durable and reliable constructions.

An even further object of the present invention is to provide a new and improved trailer hitch securement system which is susceptible of a low cost of manufacture with regard to both materials and labor, and which accordingly is then susceptible of low prices of sale to the consuming public, thereby making such trailer hitch securement system economically available to the buying public.

Lastly, it is an object of the present invention to provide a new and improved trailer hitch securement system for coupling a trailer to a towing vehicle and maintaining a secure coupling of the trailer to the towing vehicle in the event of inadvertent vertical movement between the trailer and the towing vehicle, the coupling and maintaining of the secure coupling being done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a trailer hitch securement system constructed in accordance with the principles of the present invention.

FIG. 2 is an enlarged exploded view of the central section of the system of FIG. 1.

FIG. 3 is a bottom view of the system taken along line 3-3 of FIG. 2.

FIG. 4 is a plan view of a portion of the system taken along line 4-4 of FIG. 2.

FIG. 5 is a cross sectional view taken along line 5-5 of FIG. 2.

FIG. 6 is a perspective illustration of the kit of components of the trailer hitch securement system of the prior Figures.

FIG. 7 is a plan view of a coupling component constructed in accordance with an alternate embodiment of the invention.

FIG. 8 is a perspective showing of the coupling component of the alternate embodiment of the invention as shown in FIG. 7.

FIG. 9 is a cross-sectional view of a coupling assembly constructed in accordance with an alternate embodiment of the invention.

FIG. 10 is a perspective illustration of the two components of FIG. 9.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved trailer hitch securement system embodying the principles and concepts of the present invention and generally designated by the reference numeral 10 will be described.

The present invention, the trailer hitch securement system 10 is comprised of a plurality of components. Such components in their broadest context include a forward member, a rearward member, an intermediate member with a leading section and a trailing section and a central section, a bolt, and a coupling assembly. Such components are individually configured and correlated with respect to each other so as to attain the desired objective.

From a specific standpoint, in the preferred embodiment of the trailer hitch securement system, designated by reference numeral 10, first provided is a trailer 14. A towing vehicle 16 is provided. A forward member 20 is also provided. The forward member is attached to and extends rearwardly from the towing vehicle. The forward member is in a rectangular cross sectional configuration. The forward member has an upper surface. The forward member also has a lower surface. The lower surface has a first thickness. The forward member has a first aperture 22. The first aperture has is in a circular cross sectional configuration. The first aperture has a vertical axis.

A rearward member 26 is provided. The rearward member is attached to and extends forwardly from the trailer. The rearward member is in an inverted U-shaped configuration. The rearward member has a generally rectangular rearward end. The rearward end has a second thickness. The second thickness is greater than the first thickness. The rearward member has a recess 28. The recess is in a generally hemispherical configuration. The recess faces downwardly from above the first aperture.

An intermediate member 32 is also provided. The intermediate member separably couples the trailer to the forward member. The intermediate member is in a generally Z-shaped configuration. The intermediate member has a leading section 34. The intermediate member also has a trailing section 36. The intermediate member further has a central section 38. The leading section and the trailing section are horizontally disposed during use.

The leading section is in a rectangular configuration. The leading section has a third thickness. The third thickness is less than the first thickness. The leading section is spaced beneath the forward member. The leading section has a second aperture 42. The second aperture is in an elongated configuration. The second aperture has an axis. The second aperture is located beneath the first aperture.

The trailing section has a horizontal member 44. The horizontal member is in a rectangular configuration. The horizontal member has a fourth thickness. The fourth thickness is equal to the third thickness. The horizontal member is positioned beneath. The horizontal member is provided in contact with the trailer. The horizontal member has a third aperture 46. The third aperture is in a square configuration. The trailing section has two tabs 50, 52. The two tabs are vertically oriented. The two tabs extend upwardly from the horizontal component. In this manner a U-shaped configuration spanning the trailer is formed. The two tabs have opposed ends 54, 56. The trailing section has a lower fourth aperture 58. The fourth aperture is in a square configuration. In this manner bolt rotation is abated. The fourth aperture is provided co-axial with the third aperture.

Provided next is a bolt 62. The bolt has a head end. The bolt also has a threaded end. The bolt extends upwardly through the fourth aperture and the third aperture. A washer 64 is provided. A star-shaped nut 66 is also provided. The knurled nut is threadedly received on the threaded end of the bolt. In this manner the intermediate member is coupled to the trailer. The bolt is provided parallel with and equally spaced from the opposed ends of the two tabs. A spring clip 68 is removably coupled to the bolt 62 adjacent to the washer.

Further provided is a vertical member 70. The vertical member has a lower end 72. The lower end has a cylindrical component. The lower end extends through the first and second apertures. A lower nut 74 is provided. The lower nut is threadedly received on the threaded lower end. The lower nut is provided in facing contact with the lower surface of the forward member. The second aperture encompasses the lower nut. The vertical member has an upper end. The upper end has a ball 78.

Provided next is a lever 82. The lever is pivotally coupled to the rearward member. In this manner the ball is contacted. Further in this manner rearward member is held to the forward member and the trailer to the towing vehicle.

Provided last is a drill bit 84. The drill bit is for forming a circular aperture 86 in the trailer. The circular aperture in the trailer receives bolt 62.

FIGS. 7 and 8 illustrate an alternate embodiment of the invention. Such system 100 configures the trailing section 104 of the rearward member 106 in a V-shaped configuration. Such configuration includes two similarly configured legs 110, 112 for adjustment to allow coupling plural trailers to the towing vehicle. A spacer plate 116 is positioned on the leg 110 to bring both legs to a common elevation.

A further alternate embodiment of the invention is illustrated in FIGS. 9 and 10. In this embodiment, a modified coupling assembly is utilized between the vehicle and the trailer. Such alternate embodiment includes a rearwardly extending intermediate member 32 with vertically extending tabs 50, 52 to define a reception zone. The rearwardly extending intermediate member has a square aperture with a vertical axis.

A first component 204 is formed in a C-shaped configuration with a horizontal upper plate 210 with a central first hole 212, and with a parallel lower plate 214 with a central second hole 216, and with a vertical intermediate plate 218 there between. The vertical intermediate plate has a first height.

A second component 206 is formed in a C-shaped configuration with a horizontal upper plate 222 with a central third hole 224, and with a parallel lower plate 226 with a central fourth hole 228, and with a vertical intermediate plate 230 there between. The vertical intermediate plate 226 has a second height greater than the first height.

A bolt 62 extends upwardly through the square lower aperture and through the fourth, second, first, and third holes.

Lastly, a star shaped nut 66 is threadedly received on the bolt above the first component and the second component.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer hitch securement system comprising:
   a vehicle with a forward member extending rearwardly therefrom;
   a trailer with a rearward member extending forwardly therefrom;
   an intermediate member having a generally Z-shaped configuration, the intermediate member having a leading section and a trailing section and a central section, the trailing section being at an elevation above the leading section;
   the forward member being located above the leading section of the intermediate member and releasably coupled thereto;
   the rearward member being located above the trailing section of the intermediate member and releasably coupled thereto;
   a coupling assembly between the trailing section and the rearward member, the coupling assembly including two vertically extending tabs (50)(52) on the trailing section of the intermediate member (32) to define a reception zone there between, a square lower aperture (58) with a vertical axis in the intermediate member between the tabs;
   a first component (204) in a C-shaped configuration with a horizontal upper plate (210) with a central first hole (216), and a parallel lower plate (214) with a central second hole (216), and a vertical intermediate plate (218) there between, the vertical intermediate plate having a first height;
   a second component (206) in a C-shaped configuration with a horizontal upper plate (222) with a central third hole (224), and a parallel lower plate (226) with a central fourth hole (228), and a vertical intermediate plate (230) there between, the vertical intermediate plate having a second height greater than the first height;
   a bolt (62) extending upwardly through the square lower aperture and through the fourth, second, first, and third holes; and
   a star shaped nut (66) threadedly received on the bolt above the first component and second component.

2. The system (100) as set forth in claim 1 wherein:
   the trailing section (104) of the intermediate member (106) is in a V-shaped configuration with two similarly configured legs (110)(112) and a pivot bolt (114) for adjustment; and
   the system includes a spacer plate (116) on one of the two similarly configured legs (110) to bring both legs to a common elevation.

* * * * *